United States Patent [19]

Stacey et al.

[11] 4,307,444

[45] Dec. 22, 1981

[54] METHOD AND APPARATUS FOR STABILIZED INTEGRAL CONTROL OF STATIC POWER FREQUENCY CHANGERS

[75] Inventors: Eric J. Stacey, Penn Hills, Pa.; Ralph D. Jessee, Shawnee Township, Allen County, Ohio

[73] Assignee: Westinghouse Electric Corp., Pittsburgh, Pa.

[21] Appl. No.: 95,898

[22] Filed: Nov. 19, 1979

[51] Int. Cl.³ .............................................. H02M 5/27
[52] U.S. Cl. ...................................... 363/161; 363/79
[58] Field of Search ....................... 363/34, 37, 78, 79, 363/159–162

[56] References Cited

U.S. PATENT DOCUMENTS

| | | | |
|---|---|---|---|
| 3,585,485 | 6/1971 | Gyugyi et al. | 363/161 |
| 3,818,315 | 6/1974 | Gyugyi et al. | 363/160 |

OTHER PUBLICATIONS

Pelly, "Thyristor Phase-Controlled Converters and Cycloconverters", Wiley-Interscience, 1971, pp. 229–259.

Gyugyi et al., "Static Power Frequency Changers", Wiley-Interscience, 1976, pp. 289–308.

*Primary Examiner*—William M. Shoop
*Assistant Examiner*—Peter S. Wong
*Attorney, Agent, or Firm*—G. H. Telfer

[57] ABSTRACT

Firing signals for the power switches in static power frequency changers are generated by comparing the integral of the output waveform ripple voltage to a repetitively generated stabilizing signal phase locked to, but having a time dependent magnitude independent of, the component waveforms of the output voltage. The stabilizing signal which changes in magnitude in one direction with time is reset to an initial level each time a firing signal is generated.

13 Claims, 3 Drawing Figures

METHOD AND APPARATUS FOR STABILIZED INTEGRAL CONTROL OF STATIC POWER FREQUENCY CHANGERS

BACKGROUND OF THE INVENTION

1. Field of the Invention:

This invention relates to methods and apparatus for synthesizing an electrical output waveform from an essentially sinusoidal, multiphase AC source voltage as a function of a reference voltage waveform utilizing static power circuits. More particularly, the invention relates to techniques for sequentially turning on the static power switches and, specifically, to stabilizing integral control of the power switch firing signals.

2. Prior Art:

Static power frequency changers take several forms, however, the best known are probably cycloconverters which produce AC power at a desired frequency from a source of AC power of a different or varying frequency, phase-controlled converters which convert an AC voltage to a controllable DC voltage and AC motor controls which generate an AC voltage of varying frequency from a constant frequency source voltage. A more thorough discussion of the various types of static power frequency changers and their operating characteristics is set forth in a book entitled *Static Power Frequency Changers* by L. Gyugyi and B. R. Pelly, Wiley-Interscience, 1976. The common characteristic of all of these static power frequency changers is that they synthesize an output waveform of a desired frequency and amplitude from a multiphase, essentially sinusoidal AC voltage of a different frequency and generally a constant amplitude. This is accomplished by generating a plurality of component waveforms from selected portions of the individual phases of the source voltage. Static power switches connected in the several phases of the source voltage are rendered conductive by a pattern of signals developed by a control circuit in such a manner that the sum of the component waveforms produces an output waveform with a mean signal level which follows a reference voltage.

Suitable power switches for use with static power frequency changers may be of the type, such as analog switches, which remain conductive only as long as a control signal is applied to them, or they may be switches such as the thyristor (also called an SCR) which are rendered conductive by a firing pulse and remain conductive until the forward current is terminated. Thyristors may be arranged in static frequency changer circuits for natural commutation, that is, the firing of the thyristors is so arranged that each successive thyristor is commutated off by the phase voltage generated by the firing of the next successive thyristor, or they may be so arranged that forced commutation off by use of additional circuitry is required.

Regardless of the type of static power switches utilized in the frequency changer, the firing signals which render the switches conductive must be generated at properly phased intervals in order to produce a quality output waveform. One method of producing these firing signals is the cosine wave crossing technique which is described in *Static Power Frequency Changers*, at pages 289 to 298 and in *Thyristor Phase-Controlled Converters and Cyloconverters*, Pelly, Wiley-Interscience, 1971, at pages 229–241. In accordance with this technique, cosine timing waves derived from, and synchronized to, the multiphase source voltage are compared with the reference voltage to produce a firing signal as the reference voltage signal level becomes equal to the signal level of each successive cosine waveform. In theory, this technique produces a very high quality output waveform. However, because this technique depends upon instantaneous signal levels, noise, such as spikes or commutation notches on the cosine timing waves, can significantly advance or retard the individual firing instants thereby introducing distortion into the output waveform. Distortion will also result in the power circuit output due to distortion and commutation notches in the source voltage. In practice it is known to stabilize the cosine timing wave control with a feedback signal which, in some instances, takes the form of an integral of the output waveform.

Another method of generating firing signals for the power switches in a static power frequency changer is the integral control technique. This technique is described in *Static Power Frequency Changers* at pages 298 to 308, in *Thyristor Phase-Controlled Converters and Cycloconverters, at pages* 242 to 245 and in U.S. Pat. No. 3,585,485, Gyugyi, et al. In integral control, the difference between the output waveform and the reference voltage, known as the ripple voltage, is integrated. Each time this integral returns to zero which indicates that the mean value of the output waveform component for the given conduction period is equal to the average value of the reference voltage over the same period, a firing signal is generated transferring conduction to the next power switch. Since the average values of waveforms used for timing the firing pulses are utilized, the system is insensitive to input line voltage distortions and noises. At the same time, the integration periods are of short duration so that the system responds quickly to changes in the reference voltage. The basic integral control system provides satisfactory results with DC reference voltages; however, instability and loss of control occurs when the basic system is used with an AC reference voltage. As explained in U.S. Pat. No. 3,585,485, when the basic integral control is used with a converter having separate groups of thyristors, such as two, three pulse converters for a six phase voltage source, application of a sine wave reference voltage to the control results over time in advacement of the firing pulses in one group and retardation of the firing pulses in the other group. This introduces considerable distortion in the output waveform and could lead to complete loss of control.

Analysis reveals that this divergence of the firing angles between the two groups of thyristors, or half converters as they are referred to, is the result of DC components of opposite polarity appearing in the output waveforms of the half converters. U.S. Pat. No. 3,585,485 discloses a technique wherein the individual half converter waveforms are summed in opposition to the reference waveform and the resultant signal is integrated to extract the average DC component. The output of the main integrator is then compared separately with the average DC component from each half wave converter to generate firing signals for each half converter which are appropriately phase shifted by an amount which compensates for the DC component. Since the compensation is proportional to the error, the system can settle into a stable state.

While stabilization of the basic integral control for static power frequency changers in accordance with the teachings of U.S. Pat. No. 3,585,485 provides a quality output waveform, that technique requires an appreciable amount of hardware. In addition to the main integrator, an integrator, a comparator and the associated circuitry are required for each group of power switches. In order to generate a three phase output waveform from a six phase source voltage using two, three pulse groups of switches for the positive and negative banks associated with each output phase, twelve such additional circuits are required.

It is a primary object of the present invention to provide a quality output waveform from a static power frequency changer using a minimum of hardware.

It is also an object of the invention to achieve the above object in a manner and with apparatus which can be used with various kinds of static power frequency converters.

More particularly, it is an object of the invention to provide stable, integral control for static power frequency changers with a minimum of hardware.

SUMMARY OF THE INVENTION

The present invention provides, in combination with the basic steps for providing integral control of static power frequency changers, a new method of stabilization of the intervals between firing signals. In accordance with the teachings of the invention, a repetitively generated stabilizing signal phase locked to the component waveforms making up the output waveform but having a time dependent magnitude independent of the component waveform magnitudes is compared with the integral of the output waveform ripple voltage. When a predetermined relationship exists between these signals, a firing signal is generated. The stabilizing signal is repetitively generated by producing a signal which changes in magnitude in one direction with time from an initial value toward the level of the integral signal and by resetting the signal to the initial value each time a firing signal is generated. Specifically, the stabilizing signal may take such forms as a ramp signal or an exponential signal which begins to increase in magnitude immediately upon reset or such signals which remain at the initial value for a preset interval after reset. Under the latter circumstances the preset interval is less than the interval between firing signals.

The invention also relates to apparatus for stabilizing the integral control used on static frequency changers with the individual elements of the apparatus carrying out the steps described above. The invention is disclosed in detail as applied to a naturally commutated cycloconverter in which the integral control generates the firing pulses for thyristors.

The success of the invention in stabilizing integral control of static power frequency changers is based upon the discovery that by comparing the integral of the output waveform ripple voltage to a signal which changes in magnitude as a fixed function of time, the instant when the integral and stabilizing signals are equal will be delayed where the tendency of the AC reference voltage is to advance the firing signals and will occur sooner where the AC reference voltage tends to retard the firing signals. Since the tendency of the AC reference voltage to advance or retard the firing signals alternates between successive firing pulses, the correction applied to each firing interval is in a direction which tends to reduce the error in the next interval also.

Since the magnitude of the stabilizing signal generated in accordance with the teachings of the invention is independent of the output and input waveform magnitudes, a quality, reliable stabilizing signal can be generated without spikes, commutation notches or other noise. In addition, since the stabilizing signal is independent except for phase of the output component waveforms, a single stabilizing signal generated by one signal generator can be used for all the power switches in a given bank of switches regardless of how they are arranged in groups within the bank. With the present invention there is, therefore, a substantial reduction in the complexity of the technique and in the circuitry required to stabilize the basic integral control with resultant savings in material and labor and increased reliability.

DESCRIPTION OF THE PREFERRED EMBODIMENT

Figure 1:
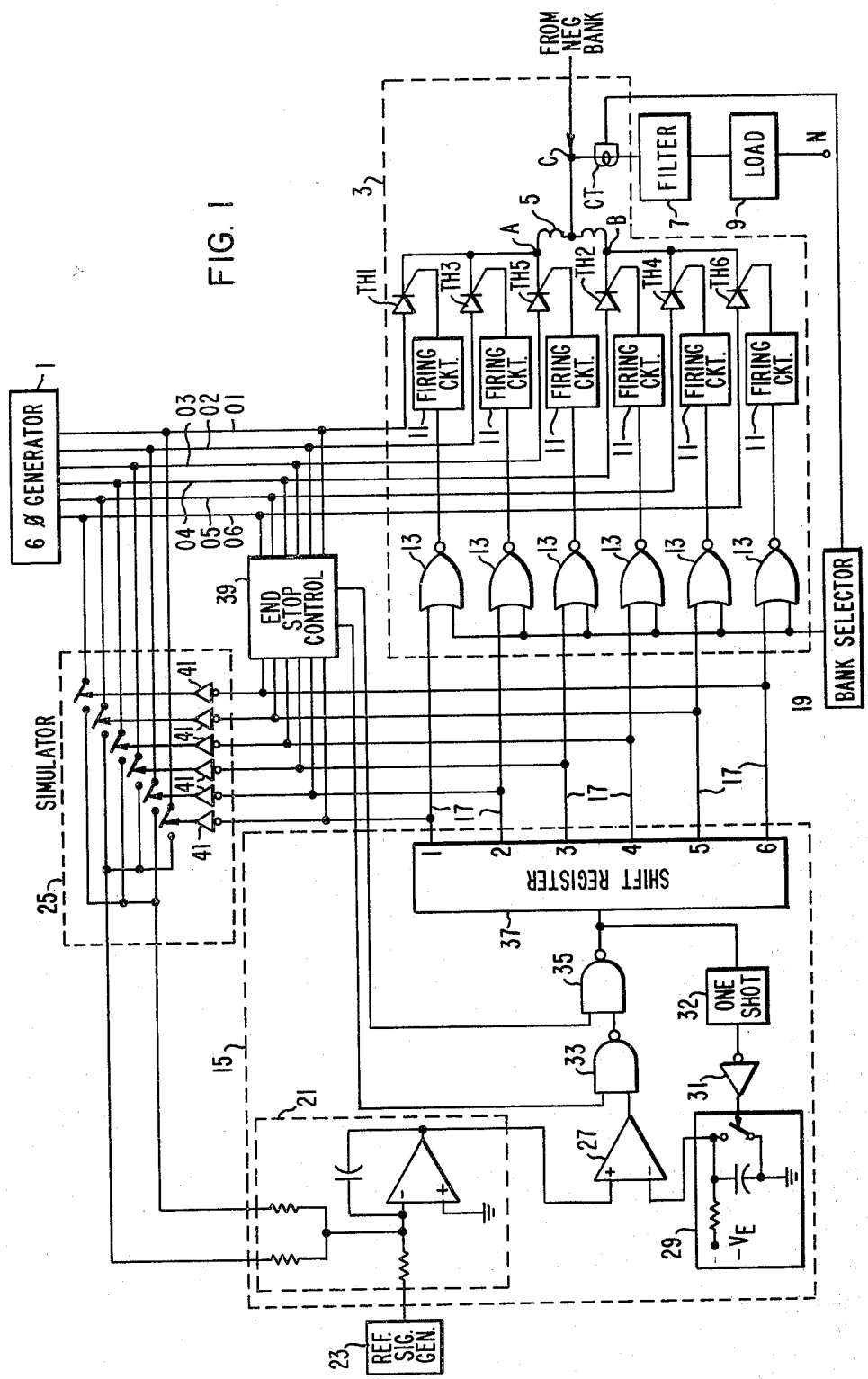
FIG. 1 is a schematic circuit diagram of a cycloconverter incorporating the present invention.

Although the invention is applicable to other types of static power frequency changers, it will be described as applied to a cycloconverter which generates an output waveform of constant frequency from an AC source of varying frequency. As illustrated in FIG. 1, six phase AC power from a variable speed generator 1 is applied to a power circuit 3 which in this particular instance is a naturally commutated thyristor circuit. For purposes of clarity, only the positive bank of the power circuit has been shown; however, it is to be understood that except for a reversal of the polarity, the circuitry of the negative bank in the power circuit is identical to that shown in FIG. 1. In the positive bank, the anodes of thyristors TH1 through TH6 are connected to phases 1 through 6 respectively of the source voltage. The cathodes of thyristors TH1, TH3 and TH5 are connected to each other as are the cathodes of thyristors TH2, TH4 and TH6 to form what is known as two, three pulse groups of thyristors. The outputs of the two thyristor groups are applied to opposite ends of an interphase transformer 5 to generate a combined six pulse waveform at the center tap of the transformer. This six pulse waveform is then added to the waveform generated by the negative bank of the power circuit to generate the output waveform which in turn is passed through the filter 7 to remove the ripple voltage and is applied to the desired load 9.

The thyristors TH1 through TH6 are fired in sequence by individual firing circuits 11 which apply a pulse to the gate electrode of the associated switch. In the naturally commutated cycloconverter circuit, generation of the individual firing pulses is properly timed such that the source phase voltage associated with each thyristor as it is pulsed on is sufficient to commutate off the previously pulsed thyristor. In the arrangement shown, thyristor TH1 of the first three pulse group remains conductive until thyristor TH3 is turned on, and likewise TH2 remains on until commutated off by TH4. In this manner, only half of the load current need be carried by the individual thyristors, however, the output waveform which appears at the center tap of the interphase transformer is the same as if the six thyristors were commutated as one group. For a thorough explanation of natural commutation and the operation of multiple pulse groups see *Static Power Frequency Changers*, Chapter 1.

The thyristor firing circuits 11 are triggered individually by signals generated by associated NOR elements 13. These NOR elements of the positive thyristor bank are gated by individual signals from an integral control circuit 15 over leads 17 and by a common signal from a bank selector circuit 19. The bank selector circuit generates a signal which blocks triggering of the thyristor firing circuits 11 for the positive thyristor bank when the output current generated by the frequency changer as detected by the current transformer CT goes negative. While a thyristor can only conduct current in the forward direction, it can generate a negative voltage waveform as long as the displacement factor is such that the current continues to flow in the forward direction. It is common to operate cycloconverters without bank selection such that firing pulses are continuously applied to the thyristors, and the present invention is perfectly suited to that type of control. However, for the purpose of illustrating how the invention is also adaptable for use with bank selection control, the interaction of the bank selector has been included in the present disclosure. While other types of bank selection controls can be used, the particular arrangement disclosed in the commonly owned copending Stacey application, Ser. No. 095,899 filed concurrently herewith is hereby incorporated by reference into this application in order to provide a description of a suitable bank selector. Bank selection is also discussed in *Static Power Frequency Changers, supra*, at pages 313–317.

The integral control circuit 15 includes an integrator 21 which integrates the difference between the reference voltage generated by a reference voltage generator 23 and a signal representative of the output waveform generated by a simulator 25. The resultant integral of the output waveform ripple voltage is applied to a comparator 27 along with a stabilizing signal generated by the stabilizing signal generator 29. As shown, the stabilizing signal generator may be an RC circuit which generates a ramp voltage from a regulated DC source. The signal is reset to zero by an analog switch 31 shunting the capacitor. Other signal generators which generate a reliable distortion free signal which changes in magnitude in one direction with time and is resettable on command to an initial value can also be used for the signal generator 29. As an option, a one shot multivibrator 32 may be inserted in the reset circuit for the stabilizing signal generator 29 as shown in FIG. 1. In this instance, the stabilizing signal will be held at its initial value for the duration of the pulse generated by the one shot multivibrator 32. Obviously this interval must be shorter than the interval between desired outputs from the comparator 27.

The output of the comparator 27 is applied through two NAND elements 33 and 35 to a shift register 37. The NAND elements 33 and 35 gate the output of the comparator 27 to the shift register 37 under the overriding control of an end stop control 39 to be discussed below. The shift register 37 generates trigger signals for the thyristor firing circuits 11 sequentially on the lines 17 as the shift register is advanced by clocking pulses from the comparator 27. Actually, the shift register 37 comprises two interlocked three stage units such that although signals are generated on the output lines sequentially with successive pulses, each output remains "on" for two input pulses of the register. If desired, appropriate pulsing shaping (not shown) can be applied to the shift register clocking pulses.

In addition to being applied to the thyristor gating circuits 11, the outputs of the shift register 37 are applied to the end stop control 39 and to the simulator 25. The simulator 25 is merely a bank of analog switches 41 which switch portions of the generator phase voltages to the integrator 21 in the control circuit in phase with the firing of the thyristors. In effect, the simulator applies to the integrator a signal which duplicates the output waveform. The positive bank output waveform is not used directly since the bank selector circuit prevents firing of the thyristors in the positive bank when the output voltage is negative; however, the control circuit must operate continuously to maintain the proper phase relationship of the firing pulses. The six component waveforms generated by the simulator 25 are intermediately combined into two composite signals for use by the bank selector circuit 19.

The end stop control 39 generates gating signals for NAND elements 33 and 35 which prevent premature and late firing respectively of the thyristors. The signal applied to the gate 33 by the end stop control remains low to prevent passing of a pulse from the comparator to the shift register until a predetermined minimum phase angle for the next source voltage to be gated is detected. Similarly, the signal applied to the gate 35 by the end stop control goes low to force clocking of the shift register if a pulse is not generated by the comparator before a certain phase angle is reached by the next source voltage. The purpose of the end stop control is to maintain proper conditions for natural commutation in the power circuit and in some end stop controls to prevent overcurrents. End stop control is not essential for the operation of this invention, however, since it is normal to provide such control its interaction with the present invention is illustrated for the sake of completeness. While other end stop controls could be used with the present invention, the commonly owned copending Stacey application Ser. No. 095,803 filed concurrently herewith is hereby incorporated by reference into this application in order to disclose the details of a suitable end stop control.

A complete cycloconverter includes a negative thyristor bank in the power circuit 3 similar to the positive bank shown, a negative bank control circuit similar to the circuit 15 to generate the firing signals for the negative bank of thyristors and a negative bank end stop control. A single bank selector circuit 19 supplies complementary signals to the positive and negative banks of the converter. The above description applies to a cycloconverter which generates a single phase output waveform. All of the hardware would have to be repeated for each additional output phase. In many systems a three phase output voltage is desired and therefore three times the above enumerated circuits would be required.

Figure 2:
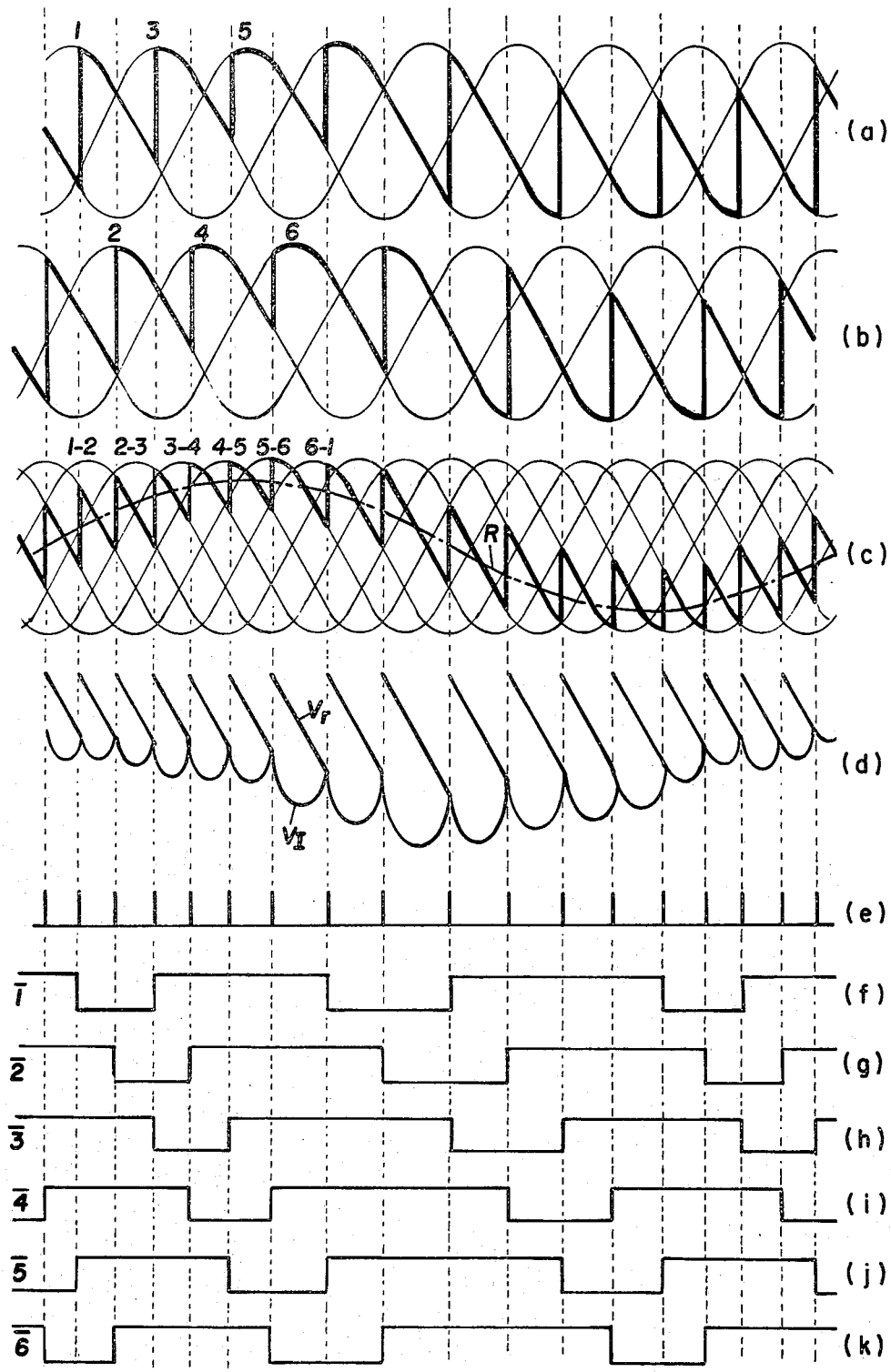
FIG. 2 illustrates voltage waveforms associated with the apparatus of FIG. 1.

The operation of the circuit of FIG. 1 can be understood more fully by reference to the positive waveforms illustrated in FIG. 2. Waveform (a) illustrates the waveform formed by combining the outputs of the thyristors TH1, TH3 and TH5 and represents the voltage that would appear at the point A in the circuit of FIG. 1. Similarly, waveform (b) illustrates the waveform generated by thyristors TH2, TH4 and TH6 which would appear at point B in the power circuit. Waveform (c) represents the composite of waveforms (a) and (b) and is the six pulse waveform that would appear at point C in FIG. 1. The sinusoidal broken line R in waveform (c) represents the reference voltage which is superimposed on the figure to show how the output waveform follows the reference waveform. Waveforms (a), (b) and (c) have been illustrated as operating continuously in both the rectification and inversion modes for purposes of explanation, but it is to be understood that if bank selection is used, that the positive bank would operate only when the output current is positive and the negative bank would supply the output when the output current is negative.

Waveform (d) of FIG. 2 shows the comparison of the ramp voltage $V_r$ generated by the stabilizing voltage generator 29 in FIG. 1 with the output $V_I$ of the integrator 21. The scalloped effect of the integral waveform confirms that the mean value of the component waveforms derived from the various phases of the source voltage approximates the average value of the reference voltage. When the output $V_I$ of the integrator becomes equal to the value of the ramp signal $V_r$, the comparator generates an output. Waveform (e) represents the clocking pulses applied to the shift register 37 by the comparator. Finally, waveforms (f) through (k) represent the state of the outputs 1 through 6, respectively, of the shift register 37.

Figure 3:
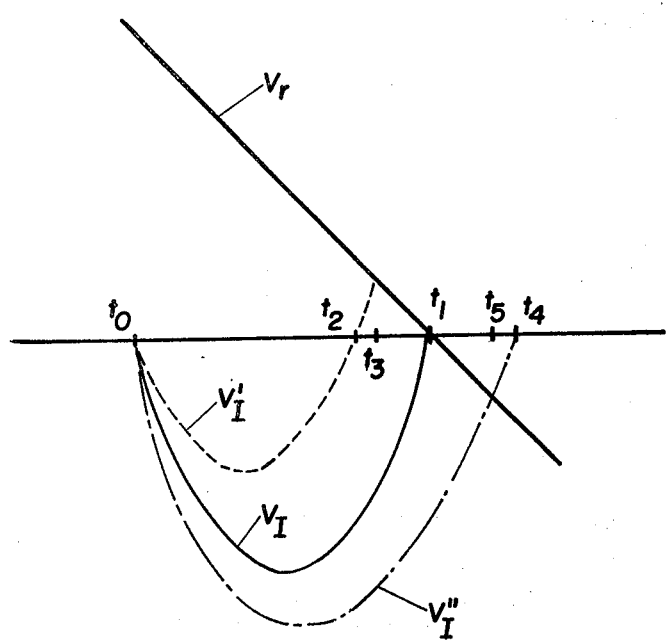
FIG. 3 is an enlarged portion of one of the waveforms of FIG. 2 illustrating the operation of the present invention.

The stabilizing effect of the ramp signal can be better understood by reference to FIG. 3 which is an exaggeration of a portion of waveform (d) in FIG. 2. For a basic integral control system, where it will be recalled a shift register clocking pulse is generated each time the integrator output $V_I$ returns to zero, a firing pulse will be generated at time $t_1$ assuming stabilized conditions with a DC reference voltage. By appropriate selection of parameters, the circuit of FIG. 1 incorporating the present invention can be arranged such that the value of the ramp signal becomes equal to zero and generates a clocking pulse at $t_1$ in response to a stable DC reference signal. Now, assume that drift tending to cause advancement of the firing interval under examination is introduced, such as by an AC reference signal. Under these conditions the output of the integrator $V_I'$ returns to zero early so that the basic integral controller would generate a clocking pulse at $t_2$. However, under our integral control system, where the clocking pulse is not generated until the output of the integrator becomes equal to the value of the ramp signal, clocking of the shift register would not occur until the time $t_3$. Similarly, where firing pulses are delayed such that the integrator output $V_I''$ does not return to zero until a time $t_4$ which is after the time $t_1$, the present integral control system will advance the pulse to the time $t_5$ which is closer to the normal time for the signal to be generated. Since it can be appreciated that the correction applied is proportional to the error, our system will settle into a stable state whereas the basic integral control would continue to drift until control was lost. The amount of correction applied is quite clearly a function of the slope of the stabilizing signal. If the slope is zero ($V_r$ horizontal), it has no effect, and if the slope is 90° ($V_r$ vertical), timing of the clocking pulses is completely determined by the stabilizing signal which is equally undesirable. The choice of the exact slope to be used depends upon the particular application. It should also be clear that the stabilizing signal need not be linear, it could be exponential and it could start changing in magnitude at an instant other than $t_0$ or any combination of these alternatives.

Returning to the waveform (d) of FIG. 2, it will be noted that the firing intervals are not all of the same duration. As will be seen from referring to waveform (c), this occurs because the selected segments of the source waveforms more closely follow the reference waveform as the magnitude of reference voltage decreases than when it rises and therefore a longer interval elapses before the integral of the ripple voltage can return to approximately zero. It should be noted that this affects both groups of thyristors and is not the result of drift which, as has previously been discussed, is eliminated by the present invention. It will also be noted from waveform (c) that the integrator is not reset after each clocking pulse is generated. This is useful in reducing low frequency and subharmonic distortion.

As can be appreciated from the above discussion, our invention provides stable, reliable integral control for static power frequency changers with a minimum of hardware. While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of synthesizing from an essentially sinusoidal multiphase AC electrical source voltage an output waveform having a mean level which follows a reference voltage waveform, said method comprising the steps of:

sequentially operating a plurality of switches in response to firing signals to generate from said essentially sinusoidal multiphase AC electrical source voltage a plurality of component waveforms;

summing said component waveforms to produce the output waveforms; and producing said firing signals by generating a signal equal to the difference between the entire output voltage waveform and the reference voltage waveform, integrating said difference signal as a function of time, repetitively generating a stabilizing signal phase locked to said component waveforms but having a time dependent magnitude independent thereof, comparing the integral signal and the stabilizing signal, and generating said firing signals when a predetermined relationship exists between said integral signal and the stabilizing signal.

2. The method of claim 1 wherein said firing signals are generated when said integral signal is equal to said stabilizing signal.

3. The method of claim 2 wherein said stabilizing signal is generated as a ramp function of time.

4. The method of claim 2 wherein said stabilizing signal is generated as an exponential function of time.

5. The method of claim 3 or 4 wherein the magnitude of said stabilizing signal is maintained at an initial value for a preset interval following reset, said preset interval being shorter in duration than the interval between firing signals.

6. The method of claim 1 wherein said stabilizing signal is repetitively generated by generating a signal which changes in magnitude in one direction with time toward the level of the integral signal from an initial value and resetting said signal to said initial value each time a firing signal is generated.

7. A static power frequency changer for applying to a load an output waveform synthesized from an essentially sinusoidal multiphase AC voltage generated by a voltage source, with said output waveform being synthesized as a function of a reference voltage waveform produced by a reference waveform generator, said apparatus comprising:

a plurality of power switches connected between the phases of the voltage source and the load, said power switches being rendered conductive by firing signals; and means for generating said firing signals comprising summing means for generating a signal representative of the difference between the output waveform and the reference waveform, an integrator for generating a signal representative of the time integral of said difference signal, a signal generator for repetitively generating a stabilizing signal phase locked to the firing signals and with a time dependent magnitude independent of the source, reference and output waveforms, means for comparing the integral signal with the stabilizing signal and for generating a firing signal when a predetermined relationship exists between the integral signal and the stabilizing signal, means for sequentially applying said firing signals to said power switches to generate a plurality of component waveforms and means for combining said component waveforms to produce said output waveforms.

8. The apparatus of claim 7 wherein said power switches are thyristors arranged in a pattern for natural commutation from a thyristor connected to one phase of the voltage source to a thyristor connected to another such phase, and wherein said firing signal generating means includes a pulse generator for generating firing pulses.

9. The apparatus of claim 8 wherein said signal generator comprises means for generating a stabilizing signal which increases in magnitude in one direction with time from an initial signal level and means for resetting said signal generator to said initial signal level in response to each firing pulse.

10. Cycloconverter apparatus comprising:

a naturally commutated power circuit for connection between a multiphase AC voltage source of varying frequency and a load to be supplied at a constant frequency, said power circuit comprising a plurality of thyristor type power switches;

means for generating a reference voltage at said constant frequency; and means for controlling the sequential application of firing pulses to said power switches as a function of the frequency, phase and magnitude of said reference voltage, said control means comprising:

means for generating a signal representative of the difference between the entire voltage waveform applied to the load and the reference voltage, an integrator for generating a signal equal to the time integral of said difference signal, a signal generator for generating a stabilizing signal which changes in magnitude in one direction with time from an initial signal level, means for comparing said stabilizing signal with said integral signal and for generating firing pulses when a predetermined relationship exists between the levels of said signals, and means for resetting said signal generator to said initial signal level in response to the generation of each firing pulse.

11. Cycloconverter apparatus as claimed in claim 10 wherein said signal generator comprises means for generating a stabilizing signal which is a ramp function of time.

12. Cycloconverter apparatus as claimed in claim 10 wherein said signal generator comprises means for generating a stabilizing signal which is an exponential function of time.

13. Cycloconverter apparatus as claimed in claim 11 or 12 wherein said signal generator includes means for maintaining the level of the stabilizing signal at said initial level for a preset interval after reset, said preset interval being less than the interval between firing pulses.

* * * * *